(No Model.) 2 Sheets—Sheet 1.
T. COLDWELL.
METAL TURNING LATHE.
No. 500,753. Patented July 4, 1893.
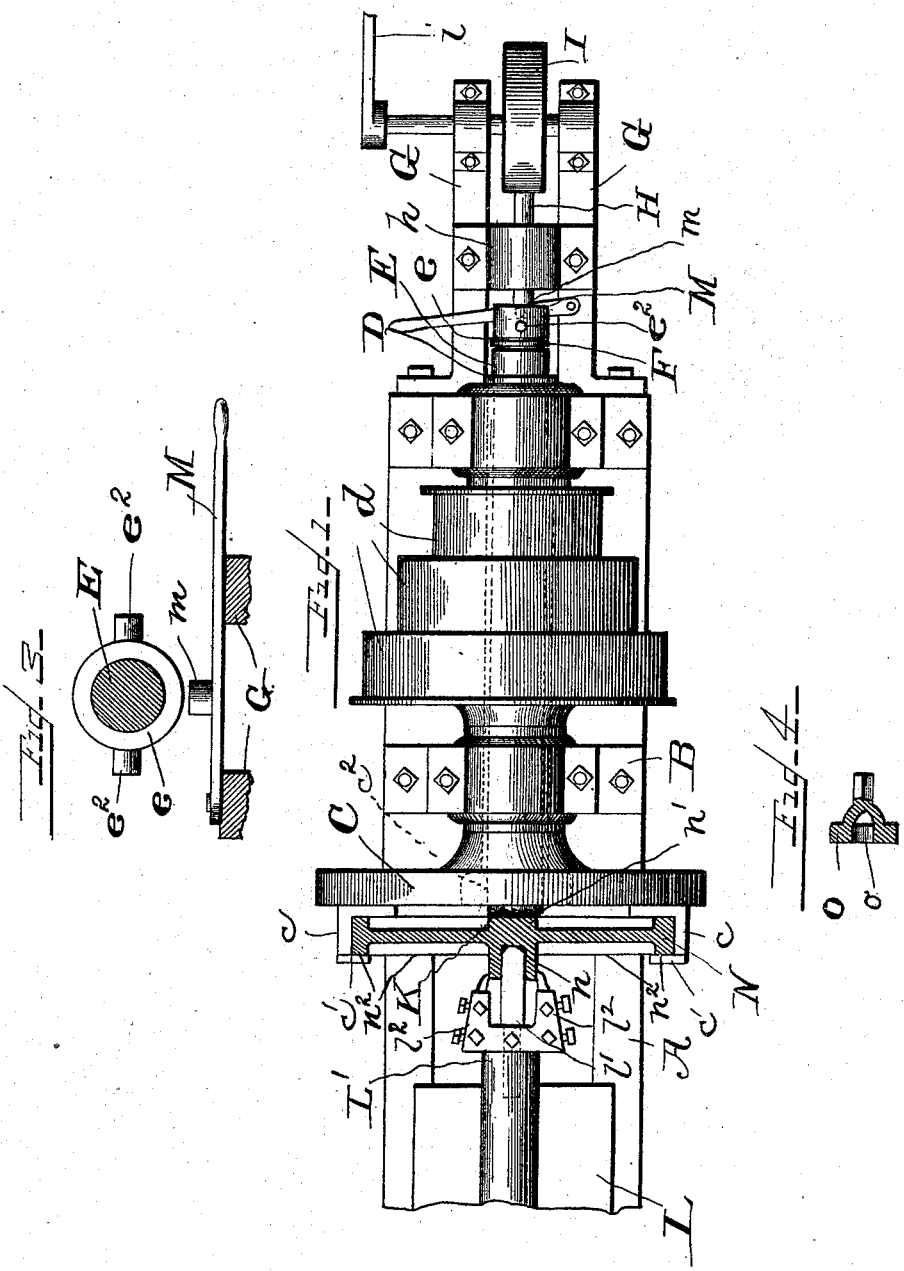

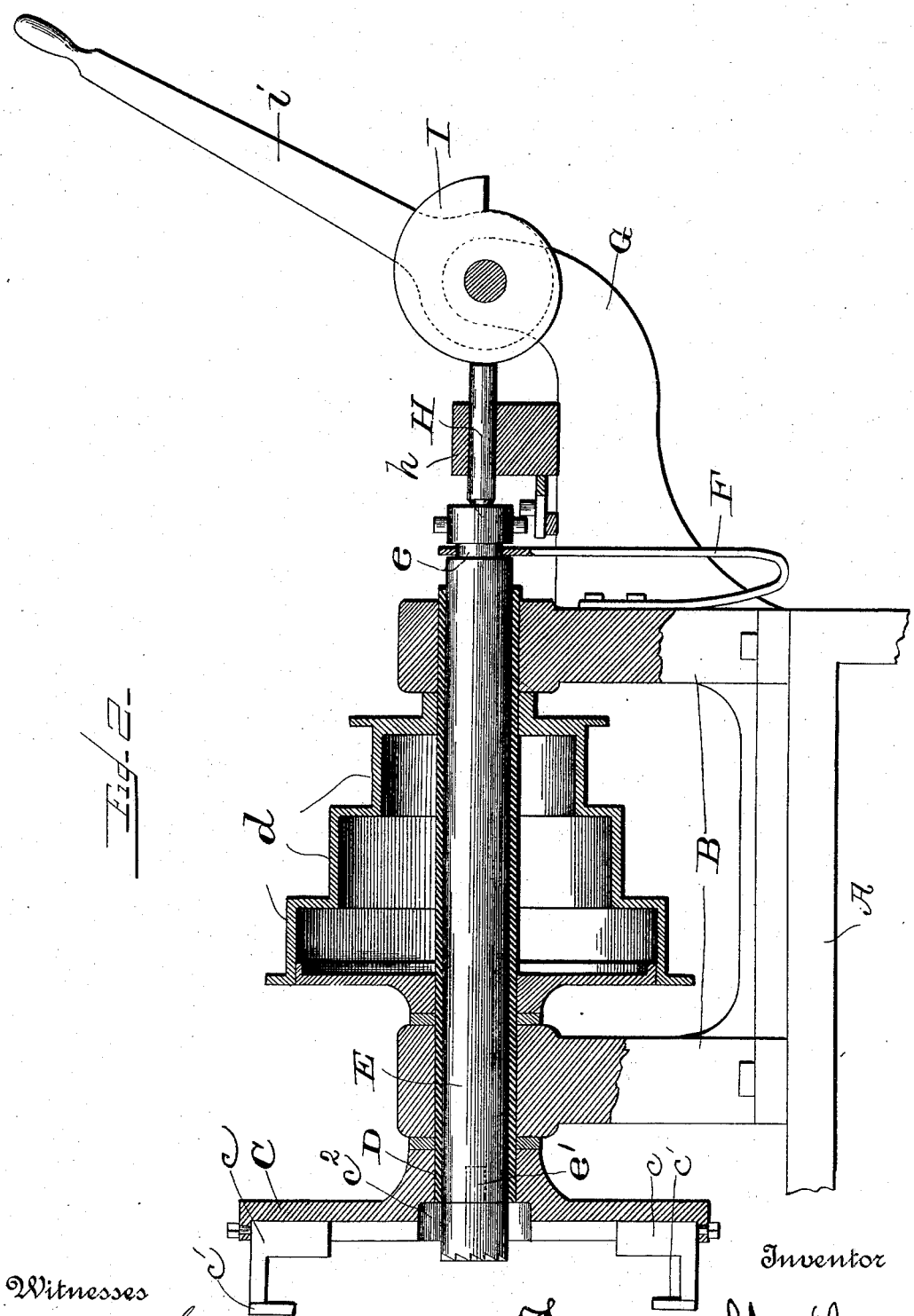

UNITED STATES PATENT OFFICE.

THOMAS COLDWELL, OF NEWBURG, NEW YORK.

METAL-TURNING LATHE.

SPECIFICATION forming part of Letters Patent No. 500,753, dated July 4, 1893.

Application filed December 21, 1892. Serial No. 455,924. (No model.)

*To all whom it may concern:*

Be it known that I, THOMAS COLDWELL, a citizen of the United States, residing at Newburg, in the county of Orange and State of New York, have invented certain new and useful Improvements in Metal-Turning Lathes; and I do hereby declare the following to be a full, clear, and exact description of the invention, such as will enable others skilled in the art to which it appertains to make and use the same.

My invention is an improvement in metal working lathes and consists in the novel features of construction and combination of parts hereinafter fully described and illustrated in the accompanying drawings which show one form in which I have contemplated embodying my invention and said invention is fully disclosed in the following description and claims.

Referring to the said drawings Figure 1 is a top plan view of a lathe embodying my invention. Fig. 2 is an enlarged sectional view of the chuck and operating devices connected therewith. Fig. 3 is a detail view of a part of the mechanism. Fig. 4 is a detail view of a part of the mechanism.

In the use of lathes for turning and boring wheel hubs and truing up wheels, after planing one face of the hub, it is a very difficult operation to turn the wheel around and chuck it again so as to plane the other face exactly true, and with the most careful work possible, the opposite faces of a wheel hub are often not parallel. When boring hubs, it often happens that the wheel gives slightly under the strain of the drill and as one side of a wheel is often a little heavier than the other, it will give more on one side than the other and the hub will therefore not be drilled perfectly true. My invention is designed to overcome these difficulties and to provide a lathe by which the hubs of wheels may be planed on both sides, turned and bored without removing the wheel from the chuck and which also affords a rigid base of resistance to the drill while the hub is being bored.

In the drawings I have shown the lathe adapted for turning, planing and boring the hubs of wheels for use on lawn mowers, but it can be adjusted to operate upon any form of wheels and may also be used for planing both sides and boring bearings and for planing both sides of other articles where it is desirable to have both planed surfaces exactly parallel.

In the drawings A represents the bed plate of my improved lathe and B is the headstock provided with the self centering chuck C of any ordinary or usual construction secured to one end of the lathe mandrel D which is revolubly mounted in the head stock and provided with a series of band pulleys $d\ d\ d$ as usual.

The mandrel D is in the form of a hollow sleeve and a boring rod E passes through it which is capable of being revolved within the said sleeve or mandrel and also of being moved longitudinally through it. The boring rod E extends beyond the outer end of the hollow mandrel D and is provided in this instance with a groove $e$ which is engaged by a spring F secured to the head stock, which exerts a pressure longitudinally of the rod and tends to push it in a direction away from the chuck. The said rod is also provided with a tool socket $e'$ in the end adjacent to the chuck.

A pair of brackets G G are secured to the outer end of the head stock and support a sliding rod H mounted in a bearing $h$ and provided with a center $h'$ which engages a suitable centered recess in the end of the boring rod E. An eccentric or cam I is revolubly mounted upon the brackets G G adjacent to the sliding rod or center and is provided with an operating arm or lever $i$ by means of which it may be rotated and thus force the rod or center H and the boring rod in a direction toward the chuck.

The adjustable dogs $c\ c$ of the chuck C have their outer faces provided with lips $c'$ projecting inwardly toward the center of the chuck as shown in the drawings and the central portion of the chuck is preferably provided with a recess $c^2$ adjacent to its center. The end of the boring rod is constructed to receive a milling tool K as shown in Figs. 1 and 2. The bed plate A is also provided with the usual tool carrier L which has a tool socket L' constructed as shown in Fig. 1 to receive a drill $l'$ and one or more turning tools $l^2$. I also provide mechanism for locking the boring rod and holding it stationary while the chuck and the mandrel D revolve and in this instance, I have shown the boring rod provided with one or more lugs or projections $e^2$ which are adapted to engage a stop lug $m$ on a pivoted stop lever M, pivoted on the top face of one of the brackets G. The stop lever M extends to a convenient position where it may be easily reached and said lever may be moved to remove the stop lug from the path of the projections on the boring rod or it may be moved to bring the stop lug into the path of the said projections, when one of said projections will engage the stop lug and the boring rod will be held stationary while the chuck revolves.

In the drawings I have shown the lathe adjusted and arranged to operate upon lawn mower wheels and I will proceed to describe its operation with respect to said wheels, it being understood that the lathe may be employed in connection with various other kinds of work. In casting the wheel N shown in the drawings, it is formed with a hub elongated on one side of the wheel as shown at $n$, and projecting but a short distance on the other side as shown at $n'$. One edge of the wheel flange, or tread will be down in the flask when the wheel is cast and this flange will be substantially true, while the upper edge of the flange in the flask will be more or less irregular. The wheel N is placed in the chuck C with the even or true edge (as $n^2$) of the flange adjacent to the lips of the chuck dogs. The chuck dogs are then adjusted to clamp the flange of the wheel and center the wheel and the boring rod is provided with a milling tool or cutter which is forced into engagement with the rear face $n'$ of the hub, thereby forcing the edge $n^2$ of the flange firmly against the lips $c'$. The chuck is then set in motion by means of a driving belt engaging one of the pulleys $d$ and the lever M is moved so as to bring the stop lug into engagement with one of the projections on the boring rod thus holding the boring rod and milling tool stationary while the chuck carrying the wheel N revolves. The tool K engages the rear face $n'$ of the hub and as the wheel revolves, the milling tool will plane the rear face as will be readily understood. As the tool cuts away the face of the hub, it is held to its work and fed up by the hand lever $i$ and cam I. After the rear face of the hub is planed the lever M is moved to withdraw the stop from the path of the lugs on the boring rod and said rod will revolve with the chuck and mandrel, by reason of the frictional engagement of the tool K with the rear face of the hub of the wheel carried by the chuck. The front face of the wheel hub is planed in any suitable manner, as by placing a milling tool in the tool holder, and forcing it up against the hub, while the chuck revolves. The exterior of the hub is then planed and the hub is bored by means of the drill $l'$ and planing tools $l^2$ as shown in Fig. 1. It will be observed that the milling tool K is held in engagement with the rear face of the hub, after the stop lever is thrown out of engagement with the boring rod and constitutes a base of resistance to support the center of the wheel while the hub is being planed and bored. This prevents the wheel from springing and enables the hub to be turned and bored true. Just before the drill penetrates the rear face of the hub, the cam lever $i$ must be thrown back to allow the spring F to withdraw the boring rod and milled tool so that the drill will not injure the tool. I may however remove the milled tool from the boring rod and substitute a plate having a central opening for the passage of the end of the drill as shown in Fig. 4, before the drilling is begun and in this case the pressure upon the rear face of the hub may be maintained until after the drilling and planing are completed. By supporting the center of the wheel in the manner described the drilling may be accomplished very much more rapidly without danger of drilling the hole untrue or of straining the wheel as the support is directly in line with and opposed to the drill. I also expedite the work by securing the drilling and planing tools to a single tool holder and drilling and turning the hub at the same time. The tools engage suitable recesses in the tool socket and are secured in place by set screws as shown in Fig. 1. In this manner it will be seen that both faces of the hub can be planed and the hub turned and bored without removing the wheel from the chuck and re-chucking, which is necessary in other forms of lathes, and which makes it extremely difficult and tedious to obtain accurate results.

It will be understood that even if the milling tool is not used in connection with the boring rod said rod and its operating cam will be employed to brace the center of the article to be operated upon, and also to force it against the lips of the chuck and assist in holding the work securely.

It is obvious that instead of a milling tool I may provide the boring rod with a drill or other tool if desired, or found convenient.

I do not wish to limit myself to the details of construction herein shown and described nor to the uses of my invention herein set forth as variations in the construction may be made without departing from the spirit of my invention and the invention may be applied and used in any connection where it is useful and desirable.

What I claim, and desire to secure by Letters Patent, is—

1. The combination with the revoluble chuck, having its dogs provided with inwardly extending lips, and a hollow mandrel connected with said chuck, of a longitudinally movable rod lying within said mandrel, means whereby the said rod may be revolved with said mandrel or held stationary, and devices for moving said rod in a direction to clamp the work held in the chuck against the said lips, substantially as described.

2. The combination with the revoluble chuck, having its dogs provided with inwardly projecting lips and a hollow mandrel connected with said chuck, of a longitudinally movable rod lying within said mandrel and provided with a cutting tool, means whereby said rod may be revolved with said mandrel or held stationary, and devices for moving said rod longitudinally in a direction to clamp the work held in the chuck against the said lips, substantially as described.

3. The combination with the revoluble chuck having the dogs provided with inwardly projecting lips, of a hollow mandrel for said chuck, the rod extending through said mandrel provided with a tool holding socket a cam for moving said rod longitudinally within the mandrel, toward the work, and a movable stop lever having a device for engaging a part connected with said rod and holding the rod from movement while the chuck revolves, substantially as described.

4. The combination with the hollow mandrel and the chuck having its dogs provided with the inwardly projecting lips, of a rod lying within said mandrel provided with a tool socket, a cam for moving said rod longitudinally within said mandrel toward the work and a stop lever having a stop lug for engaging a pin projecting from the said rod, substantially as described.

5. In a lathe the combination with the hollow mandrel and the revolving chuck, of a rod lying within said mandrel and provided with a device for engaging the work held in said chuck, and a tool holder adapted to support a tool for engaging the work in line with said rod, substantially as described.

6. In a lathe the combination with the hollow mandrel and the revolving chuck, of a rod lying within said mandrel and provided with a device for engaging the work held in the chuck, the movable center engaging said rod, the cam engaging said center for moving the rod toward the work and a retracting spring for said rod, substantially as described.

7. In a lathe the combination with the hollow mandrel and the revolving chuck, of a rod lying within the mandrel and having a device for engaging the work held in the chuck, a tool holder provided with drilling and planing tools for engaging the work in line with said device and means for moving said rod toward the work, substantially as described.

In testimony whereof I affix my signature in presence of two witnesses.

THOS. COLDWELL.

Witnesses:
HOWARD THORNTON,
L. W. Y. McCROSKERY.